(12) United States Patent
Erickson

(10) Patent No.: US 10,318,690 B2
(45) Date of Patent: Jun. 11, 2019

(54) PARTITIONING USING A CORRELATION META-HEURISTIC

(71) Applicant: Synopsys, Inc., Mountain View, CA (US)

(72) Inventor: Robert J. Erickson, Cupertino, CA (US)

(73) Assignee: Synopsys, Inc., Mountain View, CA (US)

(*) Notice: Subject to any disclaimer, the term of this patent is extended or adjusted under 35 U.S.C. 154(b) by 70 days.

(21) Appl. No.: 15/694,749

(22) Filed: Sep. 1, 2017

(65) Prior Publication Data
US 2018/0068044 A1    Mar. 8, 2018

Related U.S. Application Data

(60) Provisional application No. 62/383,289, filed on Sep. 2, 2016.

(51) Int. Cl.
| | | |
|---|---|---|
| *G06F 17/50* | (2006.01) | |
| *G06N 3/00* | (2006.01) | |
| *G06N 3/12* | (2006.01) | |
| *G06N 3/08* | (2006.01) | |
| *G06N 5/02* | (2006.01) | |

(52) U.S. Cl.
CPC ......... *G06F 17/5054* (2013.01); *G06N 3/126* (2013.01); *G06F 2217/02* (2013.01); *G06N 3/08* (2013.01); *G06N 3/082* (2013.01); *G06N 5/022* (2013.01)

(58) Field of Classification Search
CPC .......... G06N 3/08; G06N 3/082; G06N 3/126; G06F 17/5054

USPC ...................................... 716/124; 706/13, 25
See application file for complete search history.

(56) References Cited

U.S. PATENT DOCUMENTS

| | | | | |
|---|---|---|---|---|
| 5,761,077 A | * | 6/1998 | Shackleford | G06F 7/584 |
| | | | | 716/125 |
| 7,296,252 B2 | * | 11/2007 | Alpert | G06F 17/5081 |
| | | | | 716/122 |
| 8,040,981 B2 | * | 10/2011 | Amiri | H04B 7/0413 |
| | | | | 375/267 |

(Continued)

FOREIGN PATENT DOCUMENTS

WO    2007120879 A3    10/2007

OTHER PUBLICATIONS

WeightCov (weighted covariance), obtained Jan. 16, 2019 at https://www2.microstrategy.com/producthelp/10.8/FunctionsRef/Content/FuncRef/WeightedCov_weighted_covariance_.htm pp. 1-2, Apr. 2017 (Year: 2017).*

(Continued)

*Primary Examiner* — Stacy Whitmore
(74) *Attorney, Agent, or Firm* — HIPLegal LLP; Judith Szepesi

(57) ABSTRACT

A method for partitioning for a hypergraph including a plurality of nodes into a plurality of bins includes assigning each node of the hypergraph to one of the plurality of bins to generate a candidate solution, and for each pair of nodes in the candidate solution, calculating a weighted covariance based on the bin assignment of each node of the pairs of nodes in the candidate solution. The assigning and the calculating are repeated to generate an accumulated weighted covariance for the pairs of nodes, from which a seed partition of the hypergraph is generated.

21 Claims, 11 Drawing Sheets

(56) References Cited

U.S. PATENT DOCUMENTS

| | | | | |
|---|---|---|---|---|
| 8,234,612 B2* | 7/2012 | Goodman | ........... | G06F 17/5072 |
| | | | | 716/118 |
| 8,798,518 B2* | 8/2014 | Almond | ................. | G09B 7/02 |
| | | | | 434/350 |
| 9,147,025 B2* | 9/2015 | Feng | ................... | G06F 17/5072 |
| 9,317,626 B2* | 4/2016 | Chan | ....................... | G06F 17/50 |
| 10,044,505 B2* | 8/2018 | Meng | ................... | H04L 9/3073 |
| 2005/0065902 A1* | 3/2005 | De Givry | ................. | G06F 17/50 |
| | | | | 706/45 |
| 2010/0008451 A1* | 1/2010 | Amiri | ................. | H04B 7/0413 |
| | | | | 375/343 |
| 2012/0036249 A1 | 2/2012 | Chandrasekaran | | |
| 2012/0131530 A1 | 5/2012 | Moffitt et al. | | |
| 2012/0317527 A1* | 12/2012 | Moffitt | ................ | G06F 17/5027 |
| | | | | 716/108 |
| 2013/0132042 A1* | 5/2013 | Chan | ....................... | G06F 17/50 |
| | | | | 703/1 |
| 2015/0007120 A1* | 1/2015 | Erickson | ............ | G06F 17/5054 |
| | | | | 716/105 |
| 2015/0020038 A1* | 1/2015 | Feng | ................... | G06F 17/5054 |
| | | | | 716/103 |
| 2015/0319230 A1* | 11/2015 | Skjolsvold | ............ | G06F 16/835 |
| | | | | 709/224 |
| 2017/0177544 A1* | 6/2017 | Zaribafiyan | ............ | G06N 5/003 |
| 2018/0341738 A1* | 11/2018 | Kahng | ..................... | G06G 7/48 |
| 2018/0357335 A1* | 12/2018 | Chiang | ................... | G06F 17/50 |

OTHER PUBLICATIONS

Privacy document for WeightCov (weighted Covariance) (Year: 2017).*

PCT/US2017/049982, International Search Report, dated Dec. 7, 2017, 3 pages.

PCT/US2017/049982, Written Opinion, dated Dec. 7, 2017, 5 pages.

\* cited by examiner n x k Assignment Matrix

| node | Bin assignment weights | | | |
|---|---|---|---|---|
| 0 | 3 | 5 | 1 | 1 |
| 1 | 1 | 2 | 6 | 1 |
| 2 | 2 | 3 | 3 | 2 |
| ... | ... | ... | ... | ... |

500

FIG. 5 n x k Probability Matrix

| cell | Bin probabilities | | | |
|---|---|---|---|---|
| 0 | 0.3 | 0.5 | 0.1 | 0.1 |
| 1 | 0.1 | 0.2 | 0.6 | 0.1 |
| 2 | 0.2 | 0.3 | 0.3 | 0.2 |
| ... | ... | ... | ... | ... |

FIG. 6 n x n x k Covariance Matrix

|   | 0 | 1 | 2 | ... |
|---|---|---|---|---|
| 0 | NA | 0.1,0.2,-0.6,-0.1 | ... | ... |
| 1 | 0.1,0.2,-0.6,-0.1 | NA | ... | ... |
| 2 | ... | ... | NA | ... |
| ... | ... | ... | ... | ... |

FIG. 7

PARTITIONING USING A CORRELATION META-HEURISTIC

RELATED APPLICATION

The present application claims priority to U.S. Provisional Application No. 62/383,289, filed on Sep. 2, 2016, and incorporates that application by reference in its entirety.

BACKGROUND

A hypergraph is a generalization of a graph in which an edge can connect any number of vertices. Formally, a hypergraph G=(V, E) is defined as a set of vertices (or nodes) V and a set of hyperedges (or edges) E, where each hyperedge is a subset of the vertex set V, and the size or order of a hyperedge is the cardinality of this subset.

Hypergraph partitioning is an important problem with extensive application to many areas, including very large scale integration (VLSI) integrated circuit design, efficient storage of large databases on disks, and data mining. The k-way partitioning problem assigns each node of a hypergraph into one of k bins while attempting to minimize the "cut metric", i.e., the number of hyperedges that connect nodes assigned to multiple bins. Real world partitioning problems often have multi-valued cost functions in addition to the edge-cost, and obey various constraints.

For an application that partitions integrated circuit designs, the hypergraph can be thought of as a netlist that represents a design to be partitioned into k FPGA units of a system for FPGA-based prototyping. In addition to the cut metric, the application requires attention to the timing of the system and to the number and configuration of the wires available to interconnect the FPGA units.

A common method used for partitioning is the multi-level partitioning approach developed by Karypis and Kumar for the hMETIS system. This approach begins by coarsening the hypergraph using connectivity-based clustering and then repeatedly applying a local search optimization heuristic (local search) to partition the hypergraph followed by "uncoarsening" the graph. A common local search optimization heuristic is the Fiduccia-Mattheyses algorithm.

The quality of results (QoR) of the multi-level partitioning approach is sensitive to the quality of the initial solution at the coarsest level of the hypergraph. Local search can get stuck at local minima. A common approach used to work around this limitation is to run multiple trials of local search, each with a different seed solution, and to keep the best resulting solution.

A meta-heuristic implements a strategy to guide the search process for a complex optimization problem with the goal of efficiently exploring the solution space to find near-optimal solutions. A partitioning meta-heuristic is the method of generating seed solutions for local search. Common meta-heuristic approaches include random solution generation and genetic optimization.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 5 illustrates an embodiment of an assignment matrix.

FIG. 6 illustrates an embodiment of a probability matrix.

FIG. 7 illustrates an embodiment of a covariance matrix.

DETAILED DESCRIPTION

Disclosed herein are embodiments of method of improving electronic design automation for designing integrated circuits or circuit blocks using a correlation meta-heuristic that improves the results of initial solution generation by keeping track of assignments of nodes to bins, and of the correlation of node assignments between pairs of nodes. After each trial of the local search algorithm, the assignment and correlation information are updated. The correlation meta-heuristic uses the accumulated information to generate effective seed solutions for subsequent iterations. Node pairs that have a history of being assigned to the same bin are more likely to be assigned to the same bin in the resulting seed solution. This improves the overall results of the partitioning. Even if the local search gets stuck in local minima, the process may optimize pairs of nodes that will improve results if they are assigned to the same bin. Solutions with lower cost have improved information about correlation.

Figure 1:
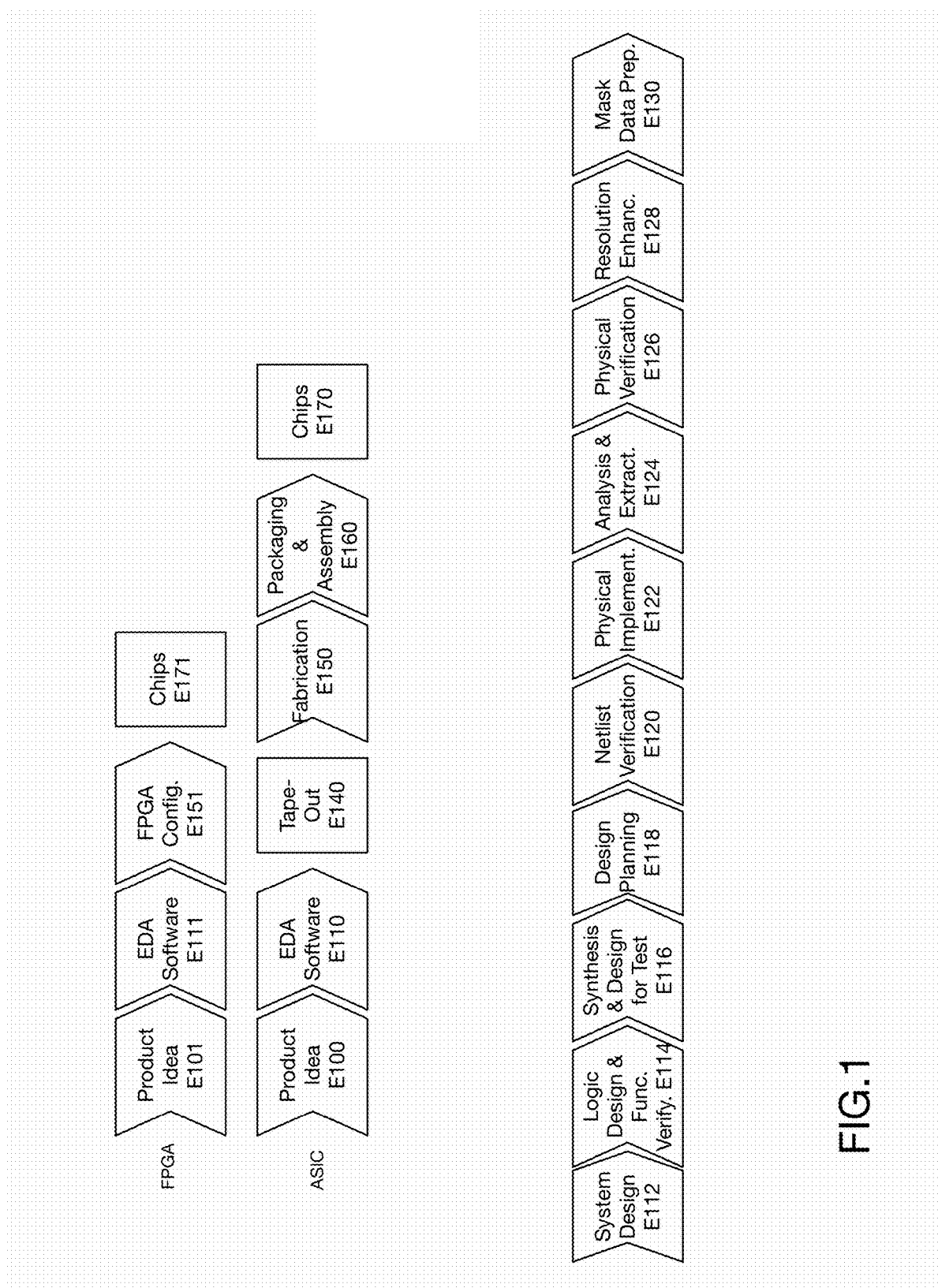
FIG. 1 is an exemplary high-level block diagram of an EDA system.

In one embodiment, the correlation meta-heuristic system described is part of one or more electronic design automation (EDA) tools and used to design, calibrate, and adjust circuit designs, and circuit blocks. An EDA flow can include multiple steps, and each step can involve using one or more EDA software tools. Some EDA steps and software tools are described below, with respect to FIG. 1. These examples of EDA steps and software tools are for illustrative purposes only and are not intended to limit the embodiments to the forms disclosed.

To illustrate the EDA flow, consider an EDA system that receives one or more high level behavioral descriptions of an IC device (e.g., in HDL languages like VHDL, Verilog, etc.) and translates ("synthesizes") this high level design language description into netlists of various levels of abstraction. A netlist describes the IC design and is composed of nodes (functional elements) and edges, e.g., connections between nodes. At a higher level of abstraction, a generic netlist is typically produced based on technology independent primitives.

The generic netlist can be translated into a lower level technology-specific netlist based on a technology-specific (characterized) cell library that has gate-specific models for each cell (functional element). The models define performance parameters for the cells; e.g., parameters related to the operational behavior of the cells, such as power consumption, delay, transition time, and noise. The netlist and cell library are typically stored in computer readable media within the EDA system and are processed and verified using many well-known techniques.

Before proceeding further with the description, it may be helpful to place these processes in context. At a high level, for an application specific integrated circuit (ASIC), the process starts with the product idea (step E100) and is realized in an EDA software design process (step E110). When the design is finalized, it can be taped-out (event E140). After tape out, the fabrication process (step E150) and packaging and assembly processes (step E160) occur resulting, ultimately, in finished chips (result E170). For a field programmable gate array (FPGA), the process starts with the product idea (step E101) and is realized in an EDA software design process (step E111). When the design is finalized, the FPGAs may be configured (event E151), applying the code to the FPGA circuits, resulting, ultimately, in finished chips (result E171).

The EDA software design process (step E110/E111) is actually composed of a number of steps E112-E130, shown in linear fashion for simplicity. In an actual design process, the particular design might have to go back through steps until certain tests are passed. Similarly, in any actual design process, these steps may occur in different orders and combinations. This description is therefore provided by way of context and general explanation rather than as a specific, or recommended, design flow for a particular circuit design.

A brief description of the components steps of the EDA software design process (step E110) will now be provided:

System design (step E112): The designers describe the functionality that they want to implement and can perform what-if planning to refine functionality, check costs, etc. Hardware-software architecture partitioning can occur at this stage. Exemplary EDA software products from Synopsys, Inc. that can be used at this step include Model Architect, Saber, System Studio, and DesignWare® products.

Logic design and functional verification (step E114): At this stage, the VHDL or Verilog code for modules in the system is written and the design is checked for functional accuracy. More specifically, the design is checked to ensure that it produces the correct outputs. Exemplary EDA software products from Synopsys, Inc. that can be used at this step include VCS, VERA, DesignWare®, Magellan, Formality, ESP and LEDA products.

Synthesis and design for test (step E116): Here, the VHDL/Verilog is translated into a netlist. The netlist can be optimized for the target technology. Additionally, the design and implementation of tests to permit checking of the finished chip occurs. Exemplary EDA software products from Synopsys, Inc. that can be used at this step include Design Compiler®, Physical Compiler, Test Compiler, Power Compiler, FPGA Compiler, Tetramax, and DesignWare® products.

Design planning (step E118): Here, an overall floorplan for the chip is constructed and analyzed for timing and top-level routing. Exemplary EDA software products from Synopsys, Inc. that can be used at this step include Jupiter and Floorplan Compiler products.

Netlist verification (step E120): At this step, the netlist is checked for compliance with timing constraints and for correspondence with the VHDL/Verilog source code. Exemplary EDA software products from Synopsys, Inc. that can be used at this step include VCS, VERA, Formality and PrimeTime products.

Physical implementation (step E122): The placement (positioning of circuit elements) and routing (connection of the same) occurs at this step. Exemplary EDA software products from Synopsys, Inc. that can be used at this step include the Astro product.

Analysis and extraction (step E124): At this step, the circuit function is verified at a transistor level, this in turn permits what-if refinement. Exemplary EDA software products from Synopsys, Inc. that can be used at this step include Star RC/XT, Raphael, and Aurora products. For FPGA design, in one embodiment the process ends here. Because FPGA programming is done through software, there are no physical configuration, resolution, and mask design issues.

For ASICS, next comes the Physical verification (step E126): At this step various checking functions are performed to ensure correctness for: manufacturing, electrical issues, lithographic issues, and circuitry. Exemplary EDA software products, Inc. that can be used at this step include the Hercules product.

Resolution enhancement (step E128): This step involves geometric manipulations of the layout to improve manufacturability of the design. Exemplary EDA software products from Synopsys, Inc. that can be used at this step include iN-Phase, Proteus, and AFGen products.

Mask data preparation (step E130): This step provides the "tape-out" data for production of masks for lithographic use to produce finished chips. Exemplary EDA software products from Synopsys, Inc. that can be used at this step include the CATS® family of products.

With respect to this application, the correlation meta-heuristic system may be implemented as part of design planning (E118) for the design of an FPGA, or ASIC circuit built via an EDA system. In one embodiment, the meta-heuristic system may be implemented as part of the system design, netlist verification, or physical implementation of the EDA system. In one embodiment, the meta-heuristic system may be applicable to solving a traveling salesman problem, which is used in routing and outside of circuit design. In one embodiment, the meta-heuristic system may be used for clock tree synthesis, associating the clocks of a VLSI design to available clock routing resources. Of course, the use of such a meta-heuristic system may be applicable outside the circuit design space as well.

Figure 2:
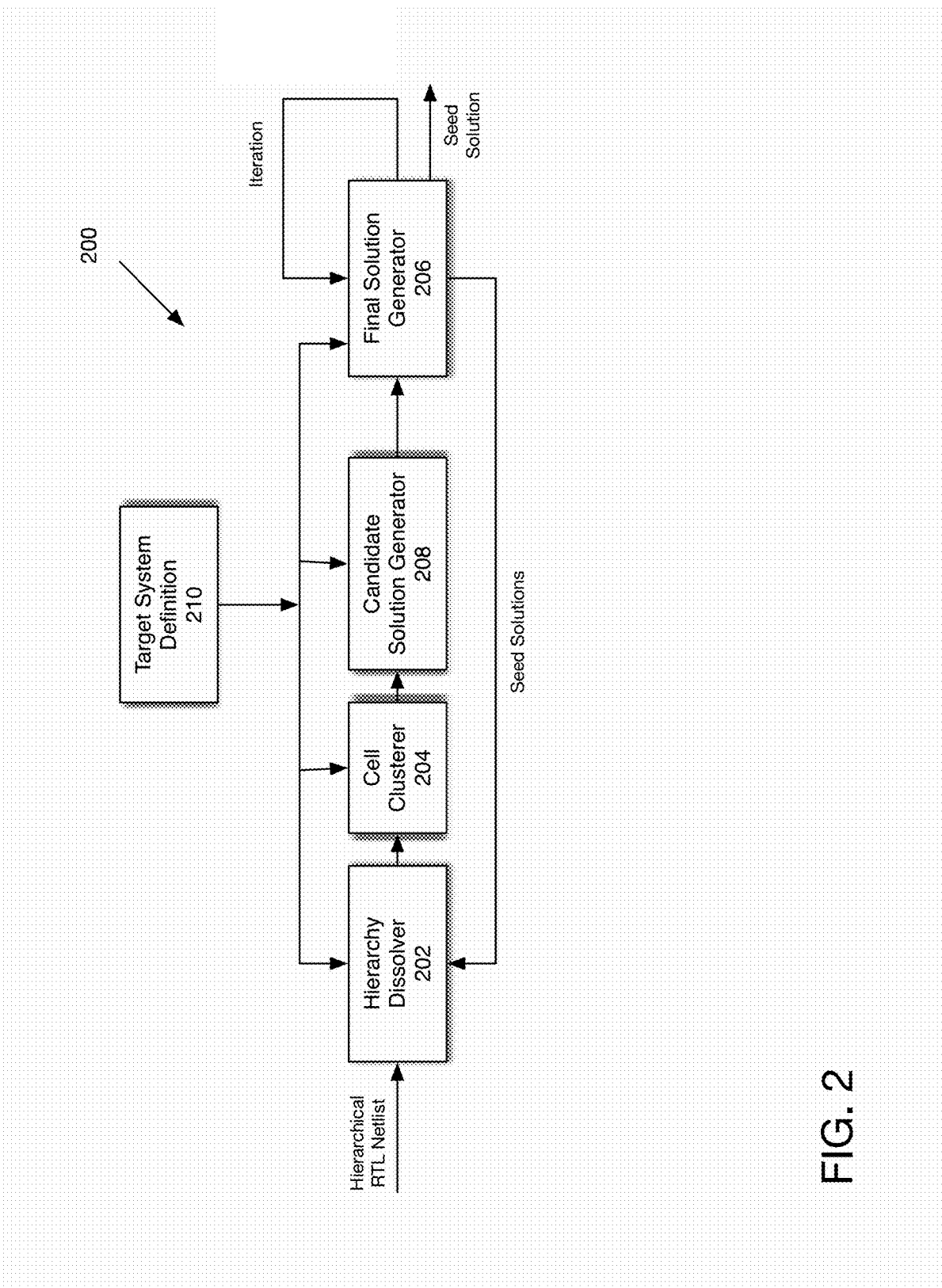
FIG. 2 is a block diagram of an embodiment of a partitioner system.

FIG. 2 is a block diagram of one embodiment of an overview of the partitioner system. A partitioner system 200 comprises a hierarchy dissolver 202, a cell clusterer 204, a candidate solution generator 208, and a final solution generator 206, and a target system definition 210. The input is a hierarchical register transfer level (RTL) netlist, in one embodiment. The target system definition 210 may be input to each of the elements 202, 204, 206, 208, to provide the constraints of the target system. As noted above, the solutions generated should meet the constraints of the system.

The hierarchy dissolver 202 receives a hierarchical RTL netlist or a partially dissolved hierarchy and dissolves the hierarchy into cells. In one embodiment, the hierarchy dissolver 202 selectively dissolves the hierarchy so that constraints are met. Constraints typically include the capacity limitations of the circuits. For example for FPGAs no hierarchical block may be of a size that exceeds the capacity of an FPGA. The dissolve step may also include heuristics that tend to improve quality of results (QoR).

The cell clusterer 204 receives the netlist of cells and clusters the cells. This reduces the complexity of the partitioning problem. The clustering must satisfy constraints that nodes must remain together. Techniques for clustering include connectivity-based clustering as described by Karypis and Kumar, and placement-based clustering. Other techniques for clustering may be used.

The initial solution generator 208 receives the netlist of clustered cells and generates initial solutions. In one embodiment, m initial solutions are generated, at the coarsest level of clustering. This step uses a partitioning meta-heuristic and local search.

The final solution generator 206 receives the initial solutions and generates a final solution. Although the term "final" is used, the final solution generator 206 may iterate to determine the ultimate final solution. In some embodiments, the final solution generator 206 iteratively decomposes clusters and refines the solution using local search. Optionally, the flow may continue to the hierarchy dissolver 202 by dissolving additional hierarchy, re-clustering, and re-running the initial solution heuristics with the intention of improving the final result. The final solution generator 206 generates an assignment of each cell in the netlist to one of the k bins in the partitioning system such that all target system constraints are met.

Figure 3:
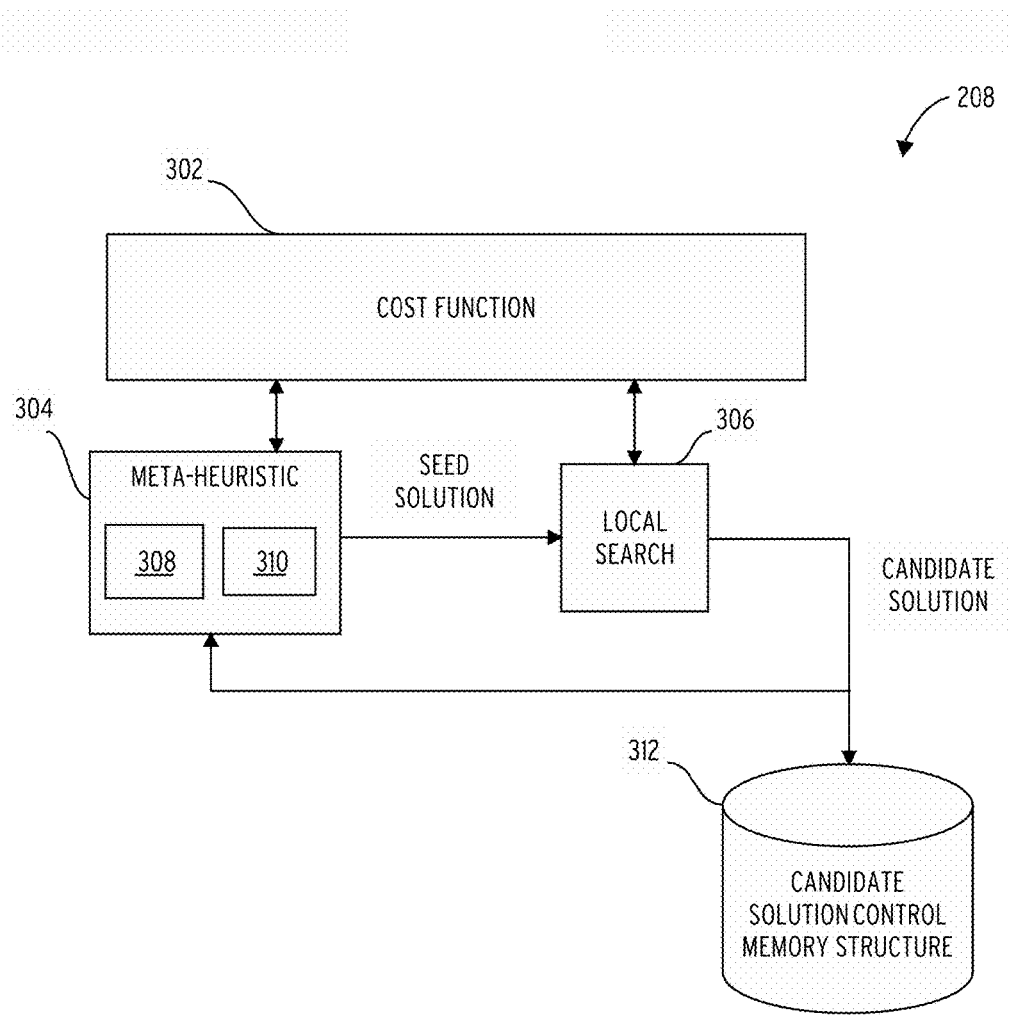
FIG. 3 is a block diagram of embodiment of a candidate solution generator.

Referring to FIG. 3, a candidate solution generator 208 in one embodiment comprises an assignment and correlation history 308, a cost function 302, a solution generator 310, a meta-heuristic 304, a local search 306, and a candidate solution control memory structure 312. In one embodiment, the candidate solution generator 208 is implemented by a processor in a computer system, which may be a local system, a cloud-based system, or a distributed system.

The meta-heuristic 304 comprises the assignment and correlation history 308 and the solution generator 310, in one embodiment. The meta-heuristic 304 receives the cost information from the cost function 302. The meta-heuristic 304 generates a seed solution and sends the seed solution to the local search 306. Common meta-heuristics include random solution generation and genetic optimization. An improved meta-heuristic utilizes the correlation between nodes of previous solutions to generate a "good" (meaning acceptably effective) seed solution.

In one embodiment, the meta-heuristic 304 receives a candidate solution from the local search 306. In some embodiments, the meta-heuristic 304 utilizes the candidate solution to generate a new seed solution.

The local search 306 receives the cost information from the cost function 302. In one embodiment, local search 306 and meta-heuristic 304 share a cost function 302. The local search 306 generates the candidate solution from the seed solution. One local search algorithm that may be used is the Kernighan-Lin algorithm as refined by Fiduccia and Mattheyses. There are other algorithms for local search that may be used, including a null search that copies the seed solution to the candidate solution. In one embodiment, local search 306 sends the candidate solution back to the meta-heuristic 304, for further iteration and refinement. In one embodiment, local search 306 stores the best candidate solutions in memory structure 312. In some embodiments, the local search 306 utilizes the cost function 302 to improve solutions. In some embodiments, the local search 306 search for a local minima to determine a candidate solution. The candidate solution control memory structure 312 receives the candidate solution from local search 306 and stores the candidate solution.

The most common local search algorithms require a legal solution, so the seed solutions must satisfy all constraints. In one embodiment, partitioning meta-heuristic and local search share a cost function (e.g., cost function 302) which, given a candidate solution, will return a positive real number (the cost) that measures the "goodness" or quality of the solution. Generally, a lower cost corresponds to a better solution.

The output of the candidate solution generator 208 is a set of m solutions that are passed to the final solution generator 206 of FIG. 2.

Figure 4:
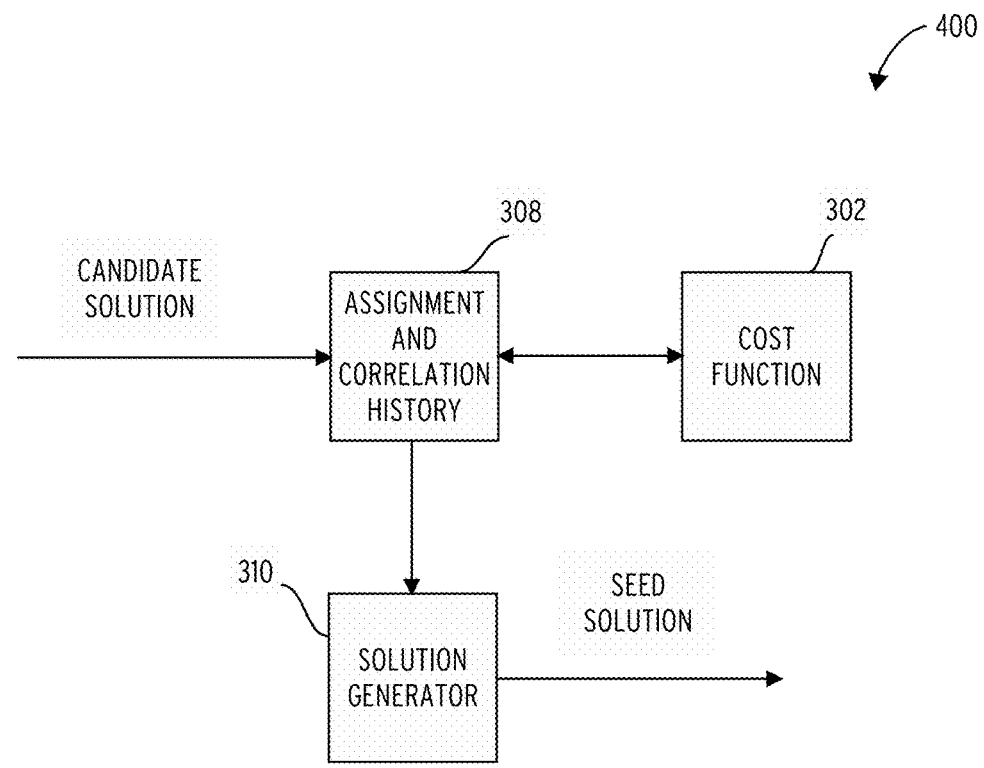
FIG. 4 is a block diagram of an embodiment of a correlation meta-heuristic.

Referring to FIG. 4, the seed solution generator 400 of the correlation meta-heuristic comprises an assignment and correlation history 308, a cost function 302, and a solution generator 310. The correlation meta-heuristic system records a history of node assignments and node correlations and applies the history information to generate seed solutions. The correlation meta-heuristic system applies the cost function to assign higher weight to better solutions.

The assignment and correlation history 308 receives a candidate solution. The assignment and correlation history 308 sends a request for cost information to cost function 302 and receives cost information from cost function 302. The assignment and correlation history 308 sends assignment and correlation history to the solution generator 310.

The solution generator 310 receives the assignment and correlation history from the assignment and correlation history 308 and generates a seed solution. This seed solution may be used to refine a next set of candidate solutions, or for partitioning.

Referring to FIG. 5, an assignment matrix 500 accumulates the sum of weighted assignments. Assignments in this context refer to the bins to which a particular node has been assigned. In some embodiments, the weight is:

where c is the cost of the local search solution and x is an algorithm parameter. In one embodiment, x is an implementation-specific constant greater than 1.0. A typical value for x is between 4.0 and 8.0. The value of x impacts the effect that the cost has on the weight. Other functions of C may be used. Generally, inverse functions are used, because higher weights are considered better, while lower costs are considered better. Of course, this is arbitrary and lower weights could be considered preferable, using a standard, non-inverse function.

In some embodiments, the assignment matrix 500 is updated after a local search result is generated. The assignment matrix 500 may be recorded by the assignment and correlation history 308 in one implementation of the correlation meta-heuristic system. In one embodiment, for each candidate solution, the assignment and correlation history 308 updates the assignment matrix (AM) for every node in the partitioning problem. If node i is assigned to bin j, then the value of AM[i,j] is incremented by the weighted assignment, W.

A covariance matrix (CM) shown in FIG. 7, accumulates the weighted sum of the covariance between all pairs of nodes. The covariance (CV) for nodes i and j and bin b is calculated as follows, in one embodiment:

$$CV(i,j,b)=(A(i,b)-E(i,b))\times(A(j,b)-E(j,b))$$

where i is the current node, j is the subsequent node, b is the bin, and E is the expected value of the assignment.

A(i,b) is 1.0 if node i is assigned to bin b; otherwise it is 0.0. E(i,b) is the expected value of assigning node i to bin b. Typically this is 1.0/k, where k is the number of bins.

For each candidate solution, the assignment and correlation history 308 updates the covariance matrix (CM) for every node pair; CM[i,j,b] is incremented by W×CV(i,j,b). The diagonal entries of CM (where i==j) are not used. The covariance matrix is symmetric. Other implementations may use an n×n matrix CM2 in which each entry CM2(i,j) is the sum of CM(i,j,b) for all b. Other implementations may use a sparse matrix in which some entries are not stored.

In some embodiments, the covariance matrix 700 is updated after a local search result.

In one embodiment, before the solution generation begins, the assignment and correlation history 308 is initialized with several candidate solutions in which a randomly generated seed is optimized using local search.

In one embodiment, the candidate solution generator 208 uses a "temperature" (T) to control convergence. T is initialized to a high value and reduced after each solution generation step. The temperature is analogous to the temperature used to control convergence of a simulated annealing algorithm. At high temperatures, bin assignment selection is nearly uniformly random. At lower temperatures, the correlation data is dominant.

Referring to FIG. 6, in one embodiment, a probability matrix (PM) 600 is generated from an assignment matrix. At the start of each generation step, the probability matrix is calculated from the history module's assignment matrix. Each entry PM(i,b) represents the expected probability that node i is assigned to bin b. Each row of PM sums to 1.0. PM may be updated as described in conjunction with FIG. 8.

Figure 8:
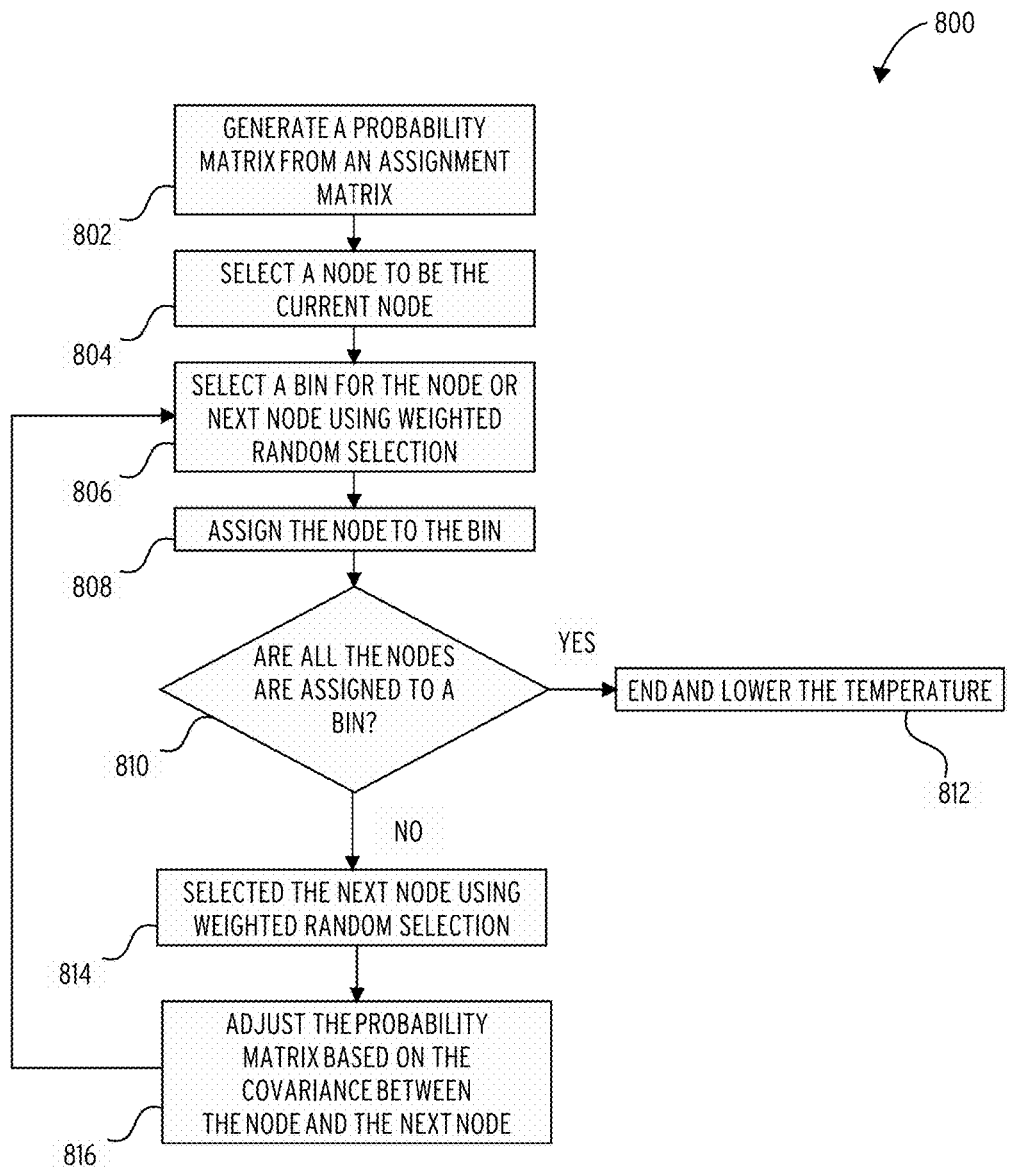
FIG. 8 is a flowchart of an embodiment of a solution generation process.

FIG. 8 is a flowchart of one embodiment of generating a seed solution. In some embodiments, a node, C, is randomly chosen to be the current node, at block 804. Other methods may be used to choose the first current node. A bin is chosen for the current node using weighted random selection with:

$$weight(i,k)=e^{(prob(i,k)/T)}$$

where T is the current temperature, at block 804. The node is assigned to the bin, at block 808. At block 810, the process determines whether the nodes have been assigned. In one embodiment, all nodes in the system are assigned. In another embodiment, a subset of nodes is selected for this process. The selection may be based on cost, criticality, size, or other factors. If all the nodes to be assigned have been, the process ends at block 812. Otherwise, the process continues to block 814.

The next node, D, is chosen, based on the covariance between the current node and the next node. The next node is chosen from among all unassigned nodes using weighted random selection with:

$$weight(i)=e^{cov(C,i)/T}$$

where cov(C,i) is the sum of cov(c,i,k) over k, at block 814. At block 816, the probability matrix is adjusted where:

$$p(D,k)=cov(C,D,k)*(a(C,k)-p(C,k))$$

where a(C,k)=1 if k is C's selected bin else 0, and normalize such that:

$$\Sigma(p(D,k))=1.0$$

This is repeated until all nodes are assigned. In one embodiment, the temperature is decreased for the next assignment pass. As selections use the temperature weighting above:

At high temperatures, selections are nearly uniform random selection.
At low temperatures, selections are highly biased toward best probability selection.
A minimum temperature may be set to avoid convergence to local minima.

In some embodiments, only assignments that satisfy all constraints are allowed.

Next, D becomes the current node and the algorithm repeats until all nodes have been assigned.

Figure 9:
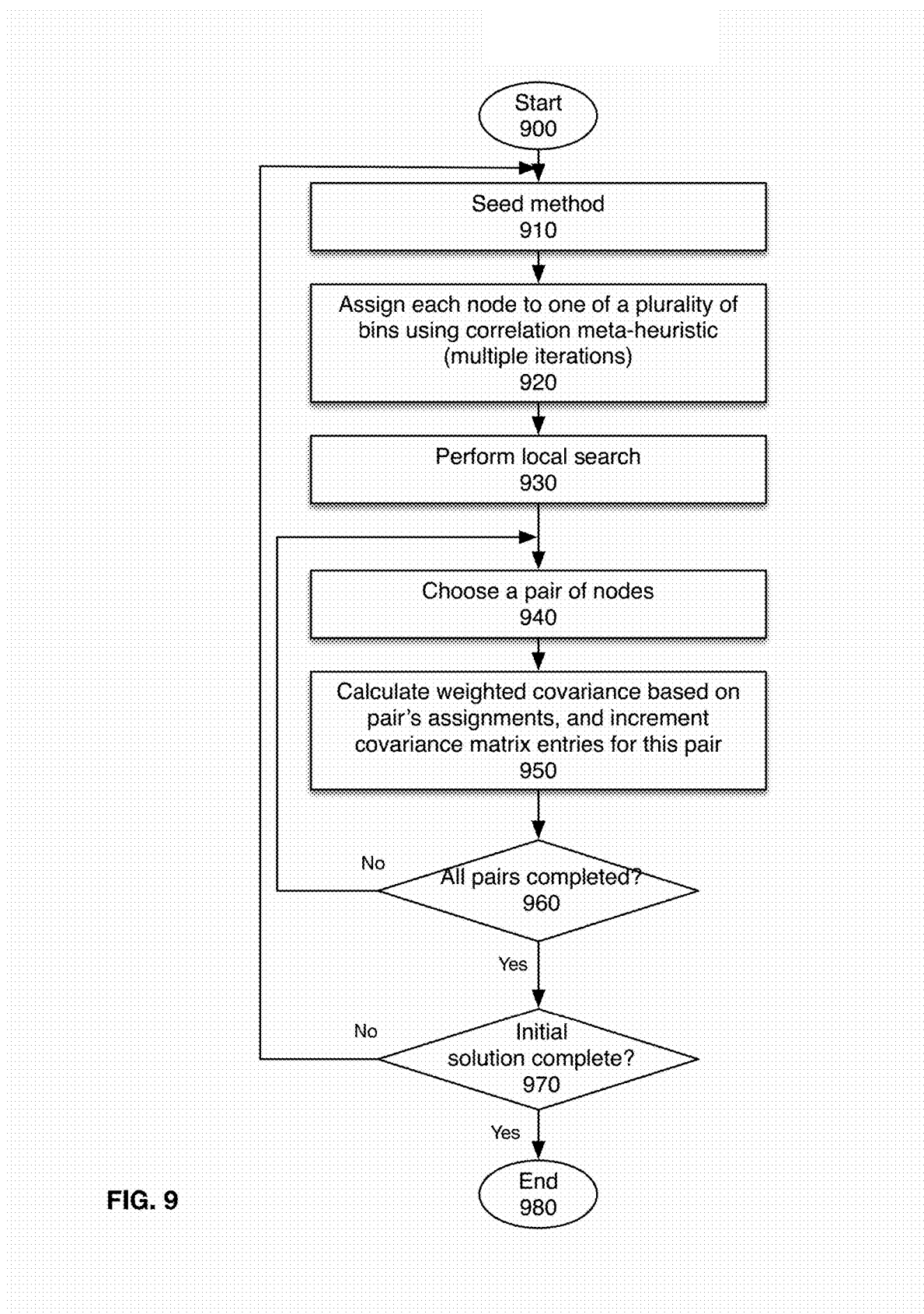
FIG. 9 is a flowchart of partitioning a hypergraph including a plurality of nodes into a plurality of bins, in accordance with one embodiment.

FIG. 9 illustrates one embodiment of partitioning a hypergraph including a plurality of nodes into a plurality of bins. At block 920, each node of the hypergraph is assigned to one of a plurality of bins using a correlation meta-heuristic. This is done for multiple iterations, to generate a candidate solutions. At block 930, a local search is performed.

At block 940, a pair of nodes is selected. In one embodiment, this selection is made randomly. At block 950, for the selected pair of nodes in the candidate solution, a weighted covariance is calculated based on the bin assignment the pair of nodes in the candidate solution. The covariance matrix entries are incremented for this pair of nodes as well. At block 960, the process determines whether all pairs have been evaluated. If not, the process returns to block 940 to select another pair of nodes. The process repeats the assigning and the calculating a plurality of times, until it is done with the repetition generating an accumulated weighted covariance for the pairs of nodes. Once all pairs have been evaluated, the process determines whether the initial solution is complete. If not, the process returns to block 910 to repeat the flow, generating new assignments and weighted covariances. If the initial solution is complete, the process ends, at block 980. The output of this flow is used to generate an initial partition of the hypergraph, generated using the accumulated weighted covariance.

Figure 10:
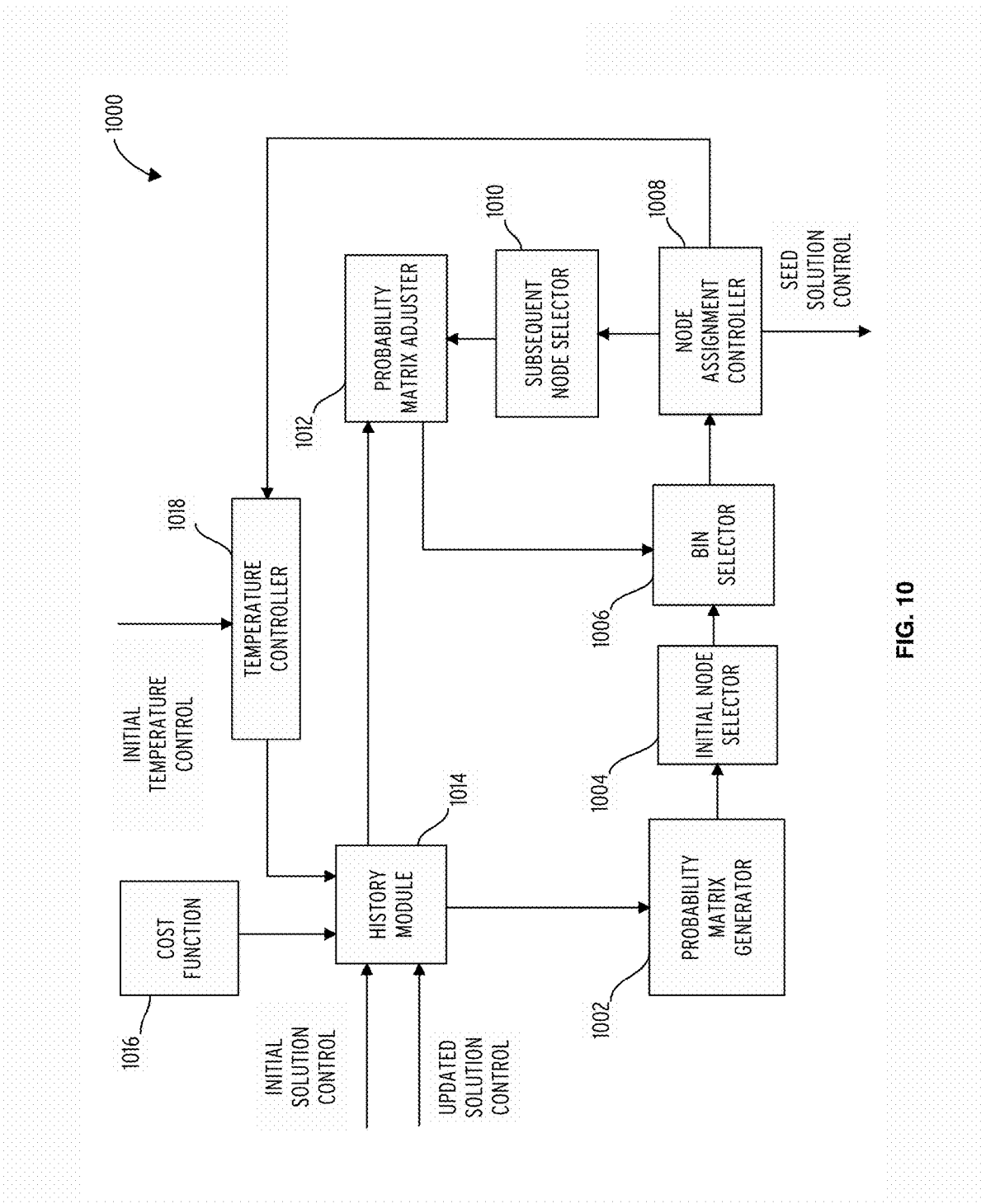
FIG. 10 illustrates an embodiment of a correlation meta-heuristic system.

FIG. 10 is a block diagram of one embodiment of a correlation meta-heuristic system 1000. The system 1000 comprises a probability matrix generator 1002, an initial node selector 1004, a bin selector 1006, a node assignment controller 1008, a subsequent node selector 1010, a probability matrix adjuster 1012, a history module 1014, a cost function 1016, and a temperature controller 1018.

The probability matrix generator 1002 receives an assignment matrix from the history module 1014, generates a probability matrix, and sends the probability matrix to the initial node selector 1004.

The initial node selector 1004 receives the probability matrix, selects an initial node, and sends the initial node to the bin selector 1006. In some embodiments, the initial node is selected based on assignment probabilities associated with each node. In one embodiment, the initial node is selected randomly.

The bin selector 1006 receives the initial node and adjusted subsequent nodes, selects a bin for the initial node and the adjusted subsequent nodes, and sends the bin assignment to the node assignment controller 1008.

The node assignment controller 1008 receives the bin assignment and determines whether all nodes are assigned to a bin. If not, the node assignment controller 1008 instructs node selector 1004 to select a next node, which will be assigned by bin selector 1006. The subsequent node selector 1010 receives the subsequent node selection control from the node assignment controller 1008, selects a subsequent node, and send the subsequent node to the probability matrix adjuster 1012. In some embodiments, the subsequent node is selected based on a correlation to the current node.

Once all nodes have been assigned, the node assignment controller 1008 generates a seed solution. In one embodiment, the node assignment controller 1008 also sends a temperature update signal to the temperature controller 1018. The temperature controller 1018 lowers the temperature, increasing the effect of prior bin assignments, for subsequent matrix generations.

The probability matrix adjuster 1012 receives the subsequent node from the subsequent node selector 1010 and receives a covariance matrix from the history module 1014. The probability matrix adjuster 1012 adjusts the probability matrix based on the covariance matrix and sends the adjusted subsequent node to the bin selector 1006.

The history module 1014 receives an initial solution control, an updated solution control, cost information from the cost function 1016, and a temperature control from the temperature controller 1018. The history module 1014 sends the assignment matrix to the probability matrix generator 1002. The updated solution control is received after each local search, with weights based on the cost of the local search solution.

The cost function 1016 sends the current cost to the history module 1014.

The temperature controller 1018 receives an initial temperature control and a temperature update control from the node assignment controller 1008. The temperature controller 1018 sends a temperature control to the history module 1014.

Figure 11:
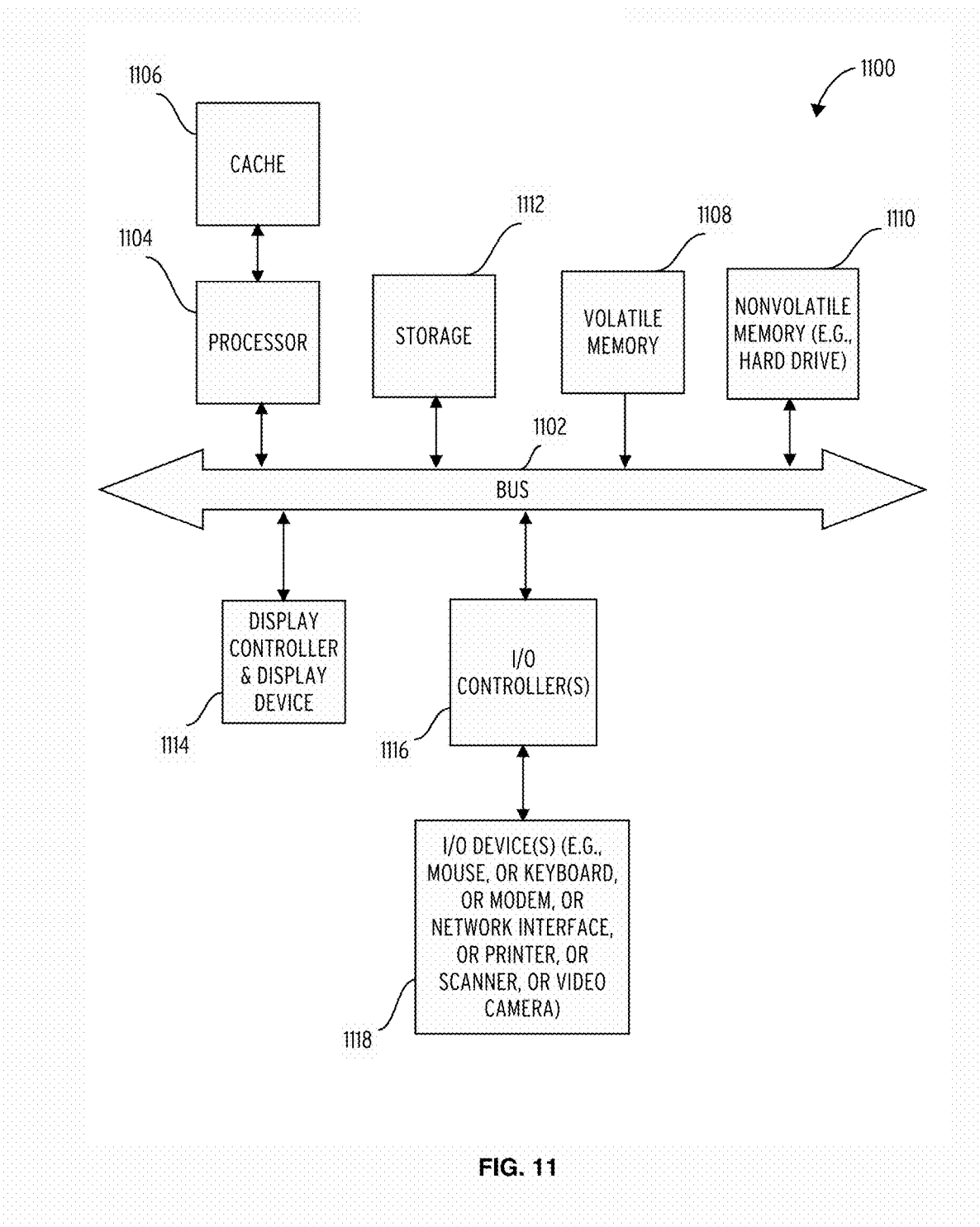
FIG. 11 illustrates one embodiment of a computer system.

As shown in FIG. 11, a computer system 1100, which is a form of a data processing system such as computer system 102, includes a bus 1102. which is coupled to one or more microprocessor 1104. In one embodiment, computer system 1100 includes one or more of a storage device 1112 (e.g. ROM), volatile memory 1108 (e.g. RAM), and a non-volatile memory 1110 (e.g., EEPROM, Flash). The microprocessor 1104 is coupled to cache memory 1106 as shown in the example of FIG. 11. Cache memory 1106 may be volatile or non-volatile memory.

The bus 1102 interconnects these various components together and in one embodiment interconnects these components microprocessor 1104, storage device 1112, volatile memory 1108, and non-volatile memory 1110 to a display controller and display device 1114. The computer system 1100 may further include peripheral devices such as input/output (I/O) devices, which may be mice, keyboards, modems, network interfaces, printers, scanners, video cameras and other devices which are well known in the art. Typically, the input/output devices 1118 are coupled to the system through input/output controllers 1116.

The volatile memory 1108 is typically implemented as dynamic RAM (DRAM) which requires power continually in order to refresh or maintain data in the memory. The non-volatile memory 1110 is typically a magnetic hard drive, magnetic optical drive, an optical drive, a DVD RAM, a Flash memory, or other type of memory system that maintains data even after power is removed from the system. Typically, the non-volatile memory will also be a random access memory although this is not required.

While FIG. 11 shows that the non-volatile memory is a local device coupled directly to the rest of the components in the data processing system, it will be appreciated that the disclosed embodiments may utilize a non-volatile memory which is remote from the system, such as a network storage device which is coupled to the data processing system through a network interface such as a modem or Ethernet interface.

The bus 1102 may include one or more buses connected to each other through various bridges, controllers and/or adapters as is well known in the art. In one embodiment the input/output controllers 1116 includes a USB (Universal Serial Bus) adapter for controlling USB peripherals. and/or an IEEE-1394 bus adapter for controlling IEEE-1394 peripherals.

It will be apparent from this description that aspects of the disclosed embodiments may be embodied, at least in part, in software (or computer-readable instructions). That is, the techniques may be carried out in a computer system or other data processing system in response to its processor, such as a microprocessor, executing sequences of instructions contained in a memory, such as storage device 1112, volatile memory 1108, non-volatile memory 1110, cache memory 1106 or a remote storage device. In various embodiments, hardwired circuitry may be used in combination with software instructions to implement the disclosed embodiments. Thus, the techniques are not limited to any specific combination of hardware circuitry and software or to any particular source for the instructions executed by the data processing system. In addition, throughout this description, various functions and operations are described as being performed by or caused by software code to simplify description. However, those skilled in the art will recognize what is meant by such expressions is that the functions result from execution of the code by a processor, such as microprocessor 1104.

A machine readable storage medium can be used to store software and data which when executed by a data processing system causes the system to perform various methods of the disclosed embodiments. This executable software and data may be stored in various places including for example storage device 1112, volatile memory 1108, non-volatile memory 1110 and/or cache memory 1106 as shown in FIG. 11. Portions of this software and/or data may be stored in any one of these storage devices.

Thus, a machine readable storage medium includes any mechanism that stores any information in a form accessible by a machine (e.g., a computer, network device, personal digital assistant, manufacturing tool, any device with a set of one or more processors, etc.). For example, a machine readable medium includes recordable/non-recordable media (e.g., read only memory (ROM); random access memory (RAM); magnetic disk storage media; optical storage media; flash memory devices; etc.).

The detailed description of embodiments of the invention makes reference to the accompanying drawings in which like references indicate similar elements, showing by way of illustration specific embodiments of practicing the invention. Description of these embodiments is in sufficient detail to enable those skilled in the art to practice the invention. One skilled in the art understands that other embodiments may be utilized and that logical, mechanical, electrical, functional and other changes may be made without departing from the scope of the present invention. The detailed description is, therefore, not to be taken in a limiting sense, and the scope of the present invention is defined by the appended claims. References within the specification to "one embodiment" or "an embodiment" are intended to indicate that a particular feature, structure, or characteristic described in connection with the embodiment is included in at least one embodiment of the present invention. The appearance of the phrase "in one embodiment" in various places within the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Some portions of the detailed description were presented as procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is conceived to be a self-consistent sequence of steps or instructions leading to a desired result.

The steps are those requiring physical manipulations of physical quantities. Usually, though not necessarily, these quantities take the form of electrical or magnetic signals of a computer readable storage medium and are capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar items are to be associated with the appropriate physical quantities and are merely convenient labels applied to these quantities. Unless specifically stated otherwise as apparent from the following discussions, it is appreciated that—throughout the present disclosure, discussions utilizing terms such as "sending" or "receiving" or "displaying" or "calculating" or "determining" or "multiplying" or "computing" or "identifying" or the like, refer to the action and processes of a computer system, or similar electronic computing device that manipulates and transforms data represented as physical (electronic) quantities within the computer system's registers and memories and other computer readable media into other data similarly represented as physical quantities within the computer system's memories or registers or other such information storage, transmission or display devices.

In the foregoing specification, the disclosed embodiments have been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

I claim:

1. A method for partitioning for a hypergraph including a plurality of nodes into a plurality of bins, comprising:
    assigning each node of the hypergraph to one of a plurality of bins to generate a candidate solution;
    for each pair of nodes in the candidate solution, calculating a weighted covariance based on the bin assignment of each node of the pairs of nodes in said candidate solution;
    repeating the assigning and the calculating a plurality of times, and generating an accumulated weighted covariance for the pairs of nodes; and
    generating a seed partition of said hypergraph using the accumulated weighted covariance.

2. The method of claim 1, further comprising:
    accumulating a weighted assignment value for each node; and
    generating the seed partition of said hypergraph using the accumulated weighted assignment value and the accumulated weighted covariance.

3. The method of claim 1, further comprising:
    utilizing a cost function to generate weights for the weighted covariance.

4. The method of claim 1, further comprising:
    utilizing a local search heuristic to transform one or more seed partitions into a candidate solution, to iterate the method.

5. The method of claim 4, wherein the seed partition in a final iteration is utilized for a coarse partitioning of a circuit description into a field programmable gate array (FPGA).

6. The method of claim 1, wherein generating the seed partition comprises:
    generating a weight for assigning each node of said hypergraph to each bin;
    selecting a current node;
    assigning the current node to a particular bin based on an assignment weight of the node to the bin;
    selecting a next node.

7. The method of claim 6, wherein a probability of the assignment of said node to the bin with the highest assignment weight increases during a plurality of generations of the seed partition.

8. The method of claim 6, wherein the selecting of the next node is based on an accumulated weighted covariance between the current node and all other nodes.

9. The method of claim 6 further comprising:
    adjusting the assignment weight of the next node, based on the accumulated weighted covariance between the current node and the next node.

10. The method of claim 6, further comprising:
    utilizing a local search heuristic to transform a seed partition into a candidate solution.

11. A correlation meta-heuristic system for partitioning for a hypergraph including a plurality of nodes into a plurality of bins, comprising:
    a bin selector to assign each node of the hypergraph to one of a plurality of bins to generate a candidate solution;
    meta-heuristic to, for each pair of nodes in the candidate solution, calculate a weighted covariance based on the bin assignment of each node of the pairs of nodes in said candidate solution;
    the correlation meta-heuristic system to repeat the assigning and the calculating a plurality of times, and generate an accumulated weighted covariance for the pairs of nodes; and
    generating a seed partition of said hypergraph using the accumulated weighted covariance.

12. The system of claim 11, further comprising:
    an assignment and correlation history to accumulate a weighted assignment value for each node; and
    a solution generator to generate the seed partition of said hypergraph using the accumulated weighted assignment value and the accumulated weighted covariance.

13. The system of claim 11, further comprising:
    a cost function to generate weights for the weighted covariance.

14. The system of claim 11, further comprising:
    a local search heuristic to transform one or more seed partitions into a candidate solution, to iterate the method.

15. The system of claim 14, wherein the seed partition in a final iteration is utilized for a coarse partitioning of a circuit description into a field programmable gate array (FPGA).

16. The system of claim 11, wherein generating the seed partition comprises:
    generating a weight for assigning each node of said hypergraph to each bin;
    an initial node selector to select a current node;
    the bin selector to assign the current node to a particular bin based on an assignment weight of the node to the bin; and
    a subsequent node selector to select a next node.

17. The system of claim 16, wherein a probability of the assignment of said node to the bin with the highest assignment weight increases during a plurality of generations of the seed partition.

18. The system of claim 16, wherein the selecting of the next node is based on an accumulated weighted covariance between the current node and all other nodes.

19. The system of claim 16, further comprising:
a matrix adjuster to adjust the assignment weight of the next node, based on the accumulated weighted covariance between the current node and the next node.

20. The system of claim 16, further comprising:
a local search heuristic to transform a seed partition into a candidate solution.

21. A method to assign a plurality of nodes in a circuit design to field programmable gate arrays (FPGAs), the method comprising:
assigning each node of the circuit design to one of a plurality of FPGAs to generate a candidate solution;
for each pair of nodes in the candidate solution, calculating a weighted covariance based on the assignment of each node of the pairs of nodes in said candidate solution;
repeating the assigning and the calculating a plurality of times, and generating an accumulated weighted covariance for the pairs of nodes; and
generating a seed partition using the accumulated weighted covariance;
generating a final partition, the final partition indicating an assigned FPGA for each of the plurality of nodes.

* * * * *